US008665944B2

(12) United States Patent
Lee et al.

(10) Patent No.: US 8,665,944 B2
(45) Date of Patent: Mar. 4, 2014

(54) IMAGE SIGNAL PROCESSOR AND METHOD THEREOF

(75) Inventors: Ho-seop Lee, Seoul (KR); Jong-sul Min, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1235 days.

(21) Appl. No.: 12/210,382

(22) Filed: Sep. 15, 2008

(65) Prior Publication Data

US 2009/0096931 A1 Apr. 16, 2009

(30) Foreign Application Priority Data

Oct. 12, 2007 (KR) ........................ 10-2007-0103131

(51) Int. Cl.
*G06F 21/00* (2013.01)

(52) U.S. Cl.
USPC ................. 375/240; 345/41; 345/60; 345/63; 380/28

(58) Field of Classification Search
USPC .......................................................... 375/240
See application file for complete search history.

(56) References Cited

U.S. PATENT DOCUMENTS 6,310,588 B1 * 10/2001 Kawahara et al. .............. 345/63
6,501,446 B1 * 12/2002 De Haan et al. ................ 345/63
6,535,244 B1 * 3/2003 Lee et al. ................... 348/208.1
7,688,284 B2 * 3/2010 Kim et al. ........................ 345/60
2003/0011614 A1 * 1/2003 Itoh et al. ....................... 345/589
2004/0179030 A1 9/2004 Cole et al.
2004/0207573 A1 * 10/2004 Ide .................................. 345/60
2005/0225565 A1 * 10/2005 Seong et al. .................. 345/611
2006/0055827 A1 3/2006 Kawahara
2006/0214883 A1 * 9/2006 Myoung et al. ................. 345/60
2007/0041446 A1 2/2007 Seong et al.
2007/0080899 A1 4/2007 Yang et al.
2007/0109321 A1 * 5/2007 Yu et al. ......................... 345/616
2007/0222712 A1 * 9/2007 Chiaki et al. .................... 345/63

FOREIGN PATENT DOCUMENTS

KR 1020070020757 A 2/2007
KR 1020070040526 A 4/2007

OTHER PUBLICATIONS

Extended European Search Report issued on Oct. 25, 2010 in counterpart European Application No. 08153648.4.
Korean Office Action dated Jan. 7, 2014 issued in corresponding Korean Patent Application No. 10- 2007-0103131.

* cited by examiner

*Primary Examiner* — Morshed Mehedi
(74) *Attorney, Agent, or Firm* — Sughrue Mion, PLLC

(57) ABSTRACT

An image signal processor and a method thereof are provided. The image signal processor sets the subfields to the intermediate illuminating statuses and moves the subfields according to the motion vectors, to display an image on a plasma display panel (PDP). Accordingly, problems such as pseudo contour, motion blur or rounding error can be prevented, and an image enhancement of a PDP is provided.

18 Claims, 7 Drawing Sheets

IMAGE SIGNAL PROCESSOR AND METHOD THEREOF

CROSS-REFERENCE TO RELATED APPLICATION

This application claims priority from Korean Patent Application No. 2007-0103131, filed Oct. 12, 2007 in the Korean Intellectual Property Office, the entire disclosure of which is hereby incorporated by reference.

BACKGROUND OF THE INVENTION

1. Field of the Invention

Apparatuses and methods consistent with the present invention relate to processing images, and more particularly, to processing a red/green/blue (RGB) image signal to display on a plasma display panel (PDP).

2. Description of the Related Art

A related art PDP divides one 16.7 ms frame into eight subfields and gives the first to eighth subfields the brightness weights of 1, 2, 4, 8, 16, 32, 64, and 128 to represent 256 graylevels. However, when an image signal is displayed on the PDP in this manner, problems such as false contour, motion blur, or rounding error are frequently generated.

FIGS. 1 to 2B explain the problems of a related art image signal processor.

Referring to FIG. 1, pixels a, b, c, d, and e have a graylevel 127, and pixels f, g, h, i, and j have a graylevel 128. In other words, the pixels a, b, c, d, and e have a graylevel 127 as the first to seventh subfields SF1, SF2, . . . , SF7 are given the weights 1, 2, 4, 8, 16, 32, and 64, and the pixels f, g, h, i, and j have a graylevel 128 as the eighth subfield SF8 is given weight 128.

The human eye tracks as indicated in phantom lines in FIG. 1 when a pattern having graylevels 127 and 128 move leftward with the speed of 6 pixels/frame. Therefore, the brightness is perceived as illustrated in FIG. 2B, which is varied from the original state as illustrated in FIG. 2A. In FIGS. 2A and 2B, the vertical axis represents the graylevels, and the horizontal axis represents the locations of the pixels.

The movement range of the human eye stays in the non-illuminating subfields SF1, SF2, . . . , SF7 of the pixels f, g, h, i, and j, and in the non-illuminating subfield SF8 of the pixels a, b, c, e, and d, causing the human eye to perceive the graylevels of the original image differently. This appears in a contour form when the gradually-changing pattern moves fast, such as the case of skin color, and thus is often called a 'pseudo contour.'

Furthermore, a motion blur may be generated when the contrast is deteriorated due to the influence of the illuminating subfields of the original image on the neighboring pixels. If the subfields are moved to compensate for the pseudo contour or motion blur, rounding error is generated due to fractional-number errors. As a result, the PDP has image degradation.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and a method capable of preventing image degradation problems such as pseudo contour, motion blur, or rounding error, and enhancing image quality displayed on a PDP, by setting the subfields in intermediate illuminating states, and moving the subfields according to motion vectors.

According to an aspect of the present invention, there is provided an image signal processor, including a pattern generating unit which generates an illuminating pattern of subfields that constitute one frame of a received image signal, in which a non-illuminating subfield does not exist between a first subfield and a second subfield, and a pattern moving unit which moves the illuminating pattern and outputs the result.

The first subfield may be the beginning subfield of the one frame, and the second subfield may be a subfield of the one frame that has a maximum brightness.

The pattern generating unit may generate the illuminating pattern in which all the subfields existing between the first and second subfields have a 75% illumination rate or above.

The pattern moving unit may move the illuminating pattern based on a motion vector of the received image signal.

The pattern moving unit may move the illuminating pattern towards the movement range of the human eye, based on the motion vector.

The image signal processor may further include a pattern selecting unit which selects one of a plurality of subfield candidates to represent the illuminating pattern and outputs the selected subfield candidate.

The image signal processor may further include a dither factor computing unit which provides a dither value for the pattern selecting unit to use to select one of the subfield candidates.

The dither factor computing unit provides the dither value so that the subfield candidates are combined with each other spatially, and output based on an illuminating pattern having one of illumination rates 0%, 25%, 50%, 75%, and 100%.

The dither factor computing unit provides the dither value so that the subfield candidates are combined with each other temporally, and output based on an illuminating pattern having one of illumination rates 0%, 25%, 50%, 75%, and 100%.

According to an aspect of the present invention, there is provided an image signal processing method including generating an illuminating pattern of subfields that constitute one frame of a received image signal, in which a non-illuminating subfield does not exist between a first subfield and a second subfield, and moving the illuminating pattern and outputting the result.

The first subfield may be the beginning subfield of the one frame, and the second subfield may be a subfield of the one frame that has a maximum brightness.

The generating may include generating the illuminating pattern in which all the subfields existing between the first and second subfields have a 75% illumination rate or above.

The moving may include moving the illuminating pattern based on a motion vector of the received image signal.

The moving may include moving the illuminating pattern towards the movement range of the human eye, based on the motion vector.

The image signal processing method may further include selecting one of a plurality of subfield candidates to represent the illuminating pattern and outputting the selected subfield candidate.

The image signal processing method may further include providing a dither value as a reference to use to select one of the subfield candidates.

The providing may include providing the dither value so that the subfield candidates are combined with each other spatially, and outputting based on an illuminating pattern having one of illumination rates 0%, 25%, 50%, 75%, and 100%.

The providing may include providing the dither value so that the subfield candidates are combined with each other temporally, and outputting based on an illuminating pattern having one of illumination rates 0%, 25%, 50%, 75%, and 100%.

BRIEF DESCRIPTION OF THE DRAWINGS

The above and other aspects of the present invention will be more apparent from the following detailed description of exemplary embodiments with reference to the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 3:
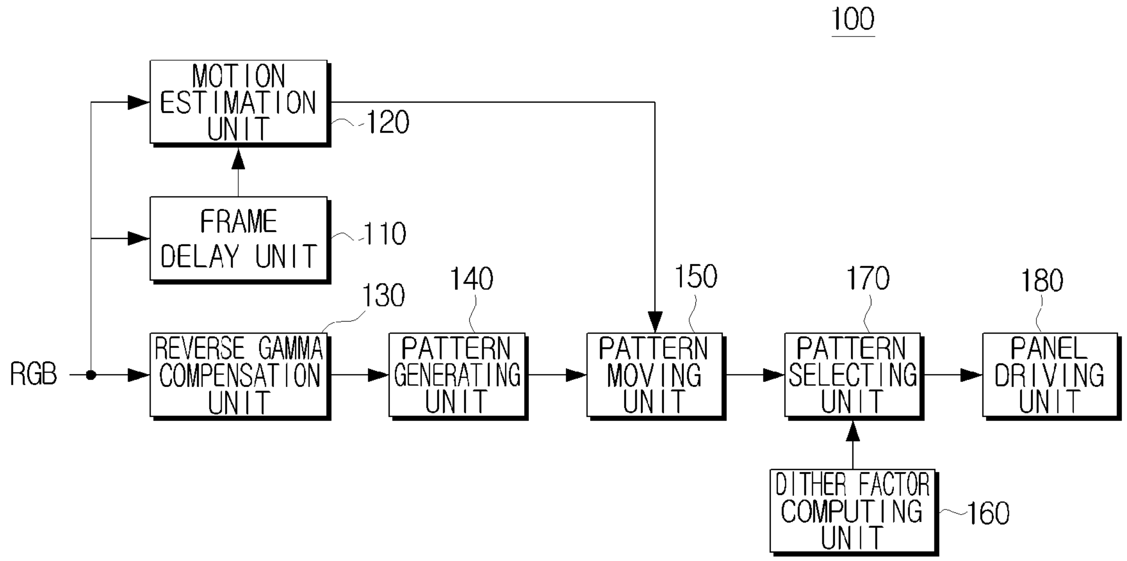
FIG. 3 is a block diagram of an image signal processor according to an exemplary embodiment of the present invention.

FIG. 3 is a block diagram of an image signal processor according to an exemplary embodiment of the present invention.

Referring to FIG. 3, an image signal processor 100 according to an exemplary embodiment of the present invention includes a frame delay unit 110, a motion estimation unit 120, a reverse gamma compensation unit 130, a pattern generating unit 140, a pattern moving unit 150, a dither factor computing unit 160, a pattern selecting unit 170, and a panel driving unit 180.

The frame delay unit 110 includes a memory to store incoming RGB image signals. The RGB signals are delayed by one frame and output as the previous frame.

The motion estimation unit 120 estimates the motion vectors of the previous and current frames using the pixel values of the previous and current frames received from the frame delay unit 110, and outputs the result. The motion estimation unit 120 may estimate the motion vectors using the sum of absolute difference (SAD) or optical flow.

The reverse gamma compensation unit 130 performs reverse gamma compensation of the RGB image signal and outputs the result. The reverse gamma compensation unit 130 compensates the gray values so that the brightness of the received RGB image signal is in linear relation with the perceived brightness.

The pattern generating unit 140 generates the illuminating patterns of the subfields of one frame. Specifically, the pattern generating unit 140 generates the illuminating patterns so that a non-illuminating subfield does not exist between the first subfield and a subfield having a maximum brightness. Accordingly, the intermediate illuminating states are defined as 0%, 25%, 50%, 75% and 100% for each of the pixel locations to express the graylevels.

For example, if an RGB image signal having the graylevel 128 is received and the first to eighth subfields are given the brightness weights of 1, 2, 4, 8, 16, 32, 64, and 128, by the related art, only the eighth subfield is illuminated by 100% to represent the graylevel 128. However, according to the exemplary embodiment of the present invention, the pattern generating unit 140 generates an illuminating pattern in which the first subfield illuminates by 100%, the second to seventh subfields, existing between the first subfield and the eighth subfield that has the maximum brightness, illuminate by 75%, and the eighth subfield illuminates by 25% to represent the graylevel 128.

The pattern moving unit 150 moves the generated illuminating pattern based on the motion vectors estimated by the motion estimation unit 120. In other words, the pattern moving unit 150 moves the locations of the intermediate-illuminating pixels defined for each of the subfields according to the motion vectors so that the illuminating pattern generated by the pattern generating unit 140 corresponds to the movement of the human eye.

The dither factor computing unit 160 outputs dither values according to the order of frames and the locations of the pixels of the received RGB image signal. The dither factor computing unit 160 may apply the Bayer dither mask or other appropriate methods.

The pattern selecting unit 170 selects one of the subfield candidates to represent the illuminating pattern based on the dither values output from the dither factor computing unit 160. Four candidate pixels are required for each of the subfields to represent the illuminating statuses of 0%, 25%, 50%, 75% and 100% defined for each pixel location.

Specifically, four candidate pixels are made OFF to represent 0% illuminating status, one candidate is made ON and three candidate pixels are made OFF to represent 25% illuminating status, two candidate pixels are made ON and two candidate pixels are made OFF to represent 50% illuminating status, and three candidate pixels are made ON and one candidate pixel are made OFF to represent 75% illuminating status. The candidate pixels form four subfield candidates for each of the subfields.

The panel driving unit 180 drives a plasma display panel (not illustrated) to display an RGB image signal according to the illumination pattern selected and output from the pattern selecting unit 170.

Figure 4:
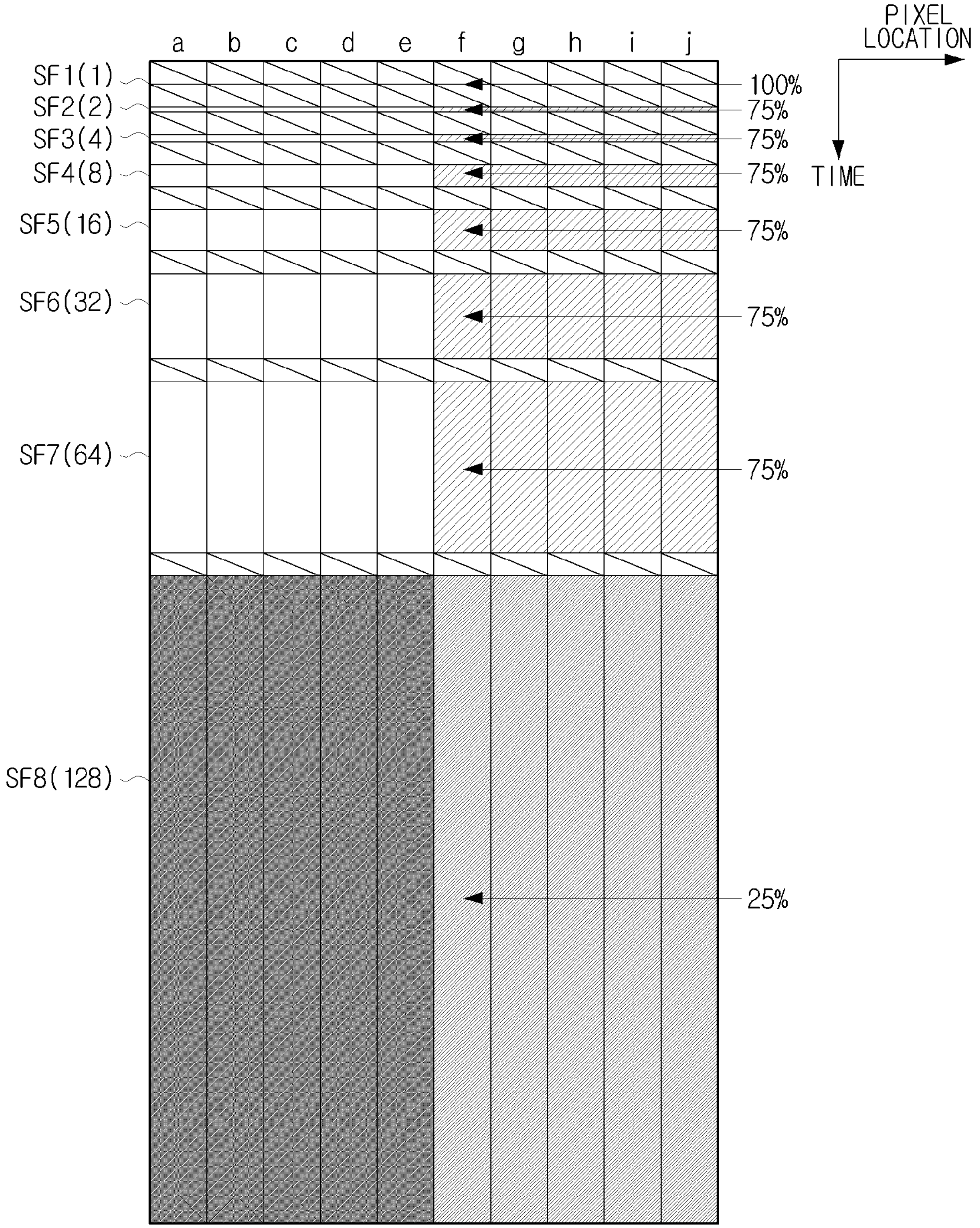
FIG. 4 illustrates the operation of a pattern generating unit of an image signal processor according to an exemplary embodiment of the present invention.

FIG. 4 explains the operation of the pattern generating unit 140 of the image signal processor according to an exemplary embodiment of the present invention.

Referring to FIG. 4, the pixels a, b, c, d, and e have a graylevel 127, and the pixels f, g, h, i, and j have a graylevel 128. The pixels a, b, c, d, and e have the graylevel 127 as the first to seventh subfields SF1, SF2, . . . , SF7 are given the weights of 1, 2, 4, 8, 16, 32, and 64, and the pixels f, g, h, i, and j have the graylevel 128 as the first subfield SF1 is illuminated by 100%, the second to seventh subfields SF2 to SF7 are illuminated by 75%, and the eighth subfield SF8 is illuminated by 25%.

The pattern generating unit 140 generates an illuminating pattern in which the non-illuminating subfield does not exist between the first subfield SF1 and the eighth subfield SF8 that has the maximum brightness. It is desirable that an illuminating pattern has the subfields SF2 to SF7 having a 75% illumination between the first subfield SF1 and the eighth subfield SF8.

Figure 5:
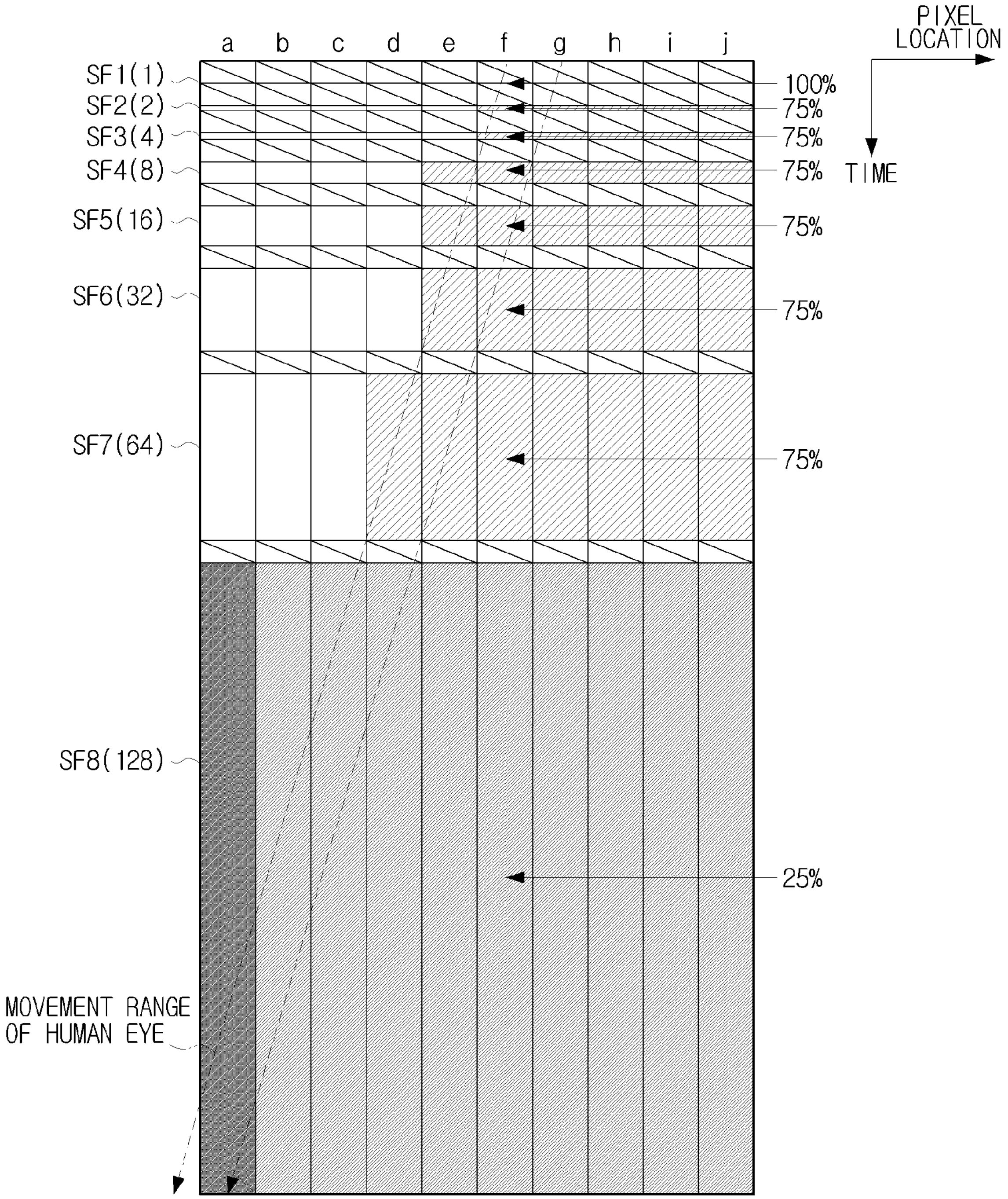
FIGS. 5 and 6 illustrate the operation of a pattern moving unit of an image signal processor according to an exemplary embodiment of the present invention.
Figure 6:
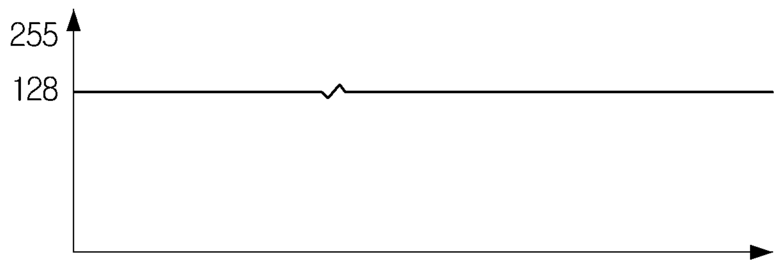

FIGS. 5 and 6 explain the operation of the pattern moving unit 150 of an image signal processor according to an exemplary embodiment of the present invention.

Referring to FIG. 5, the pattern moving unit 150 moves an illuminating pattern according to the movement of the human eye on the leftward moving image. Accordingly, the illuminating patterns of the fourth to sixth subfields SF4 to SF6 are moved to pixel location e, the illuminating pattern of the seventh subfield SF7 is moved to pixel location d, and the illuminating pattern of the eighth subfield SF8 is moved to pixel location b, to thereby coincide with the movement range of the human eye.

Figure 1:
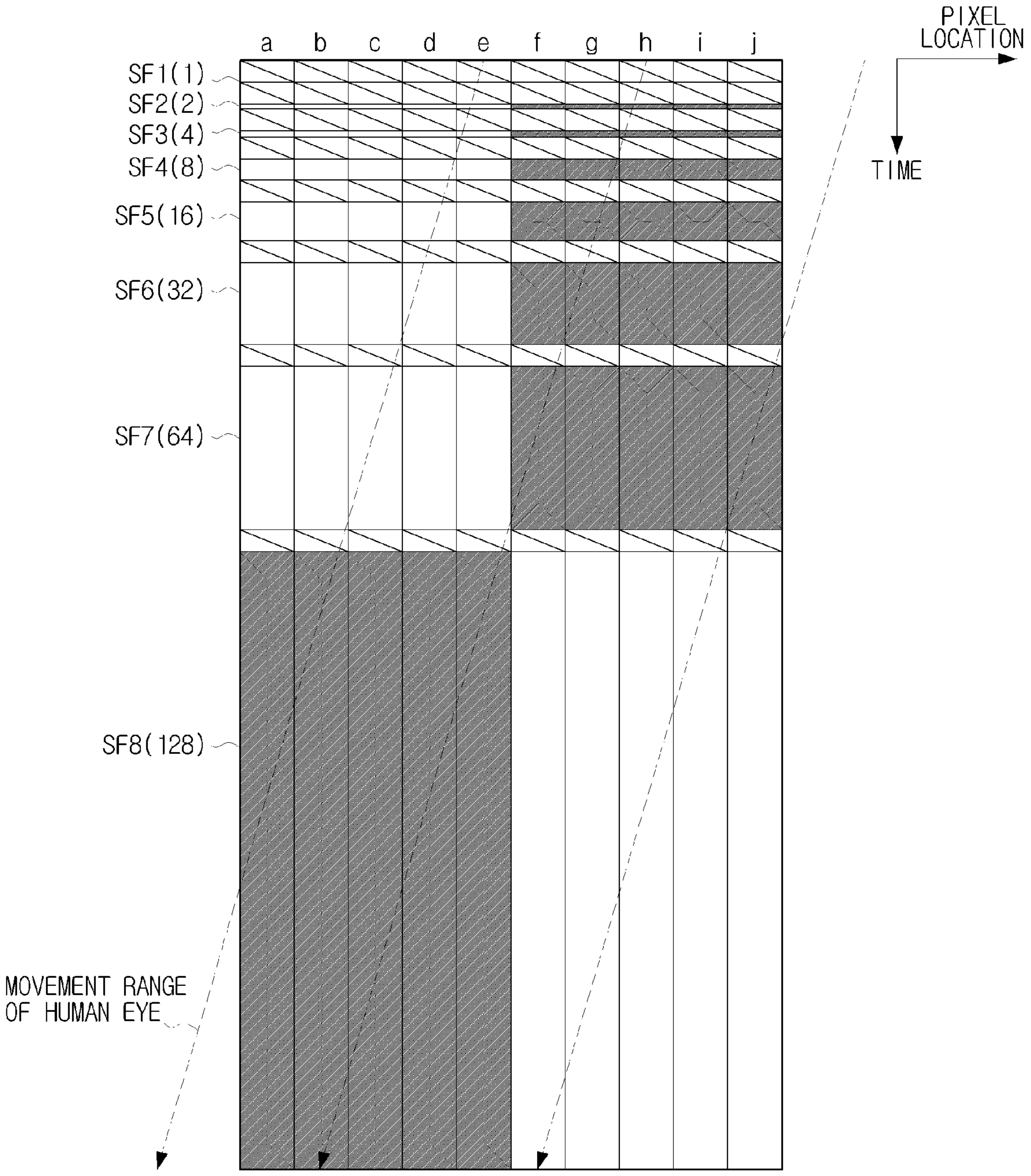
FIG. 1 (RELATED ART)
FIG. 1 explains the problems of a related art image signal processor.
Figure 2A:
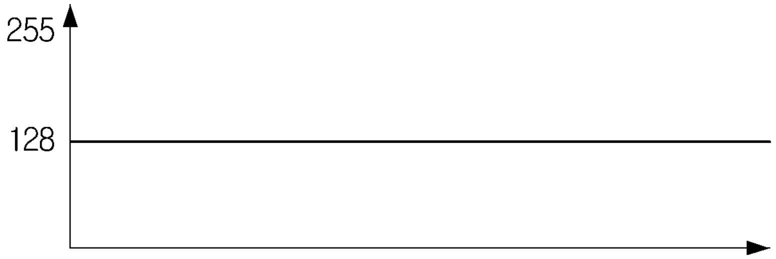
FIG. 2A (RELATED ART)
FIGS. 2A and 2B explain the problems of a related art image signal processor.
Figure 2B:
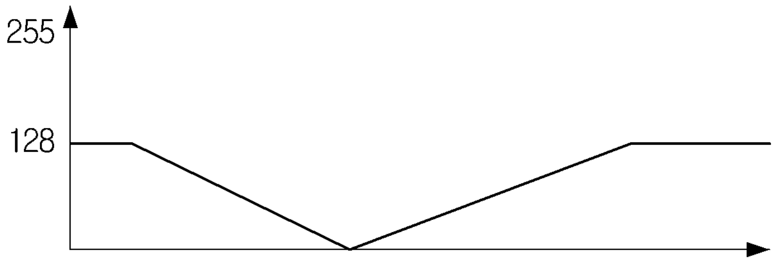
FIG. 2B (RELATED ART)

By moving the illuminating patterns as explained above, the perceived brightness of FIG. 6 coincides with the graylevels of the original image in FIG. 2A. FIG. 6 illustrates the brightness integrated by time when the illuminating patterns are moved according to the motion vectors. As explained above, as the non-illuminating subfield does not exist, rounding error is avoided. In FIG. 6, the vertical axis represents the graylevels, and the horizontal axis represents the locations of the pixels.

Figure 7:
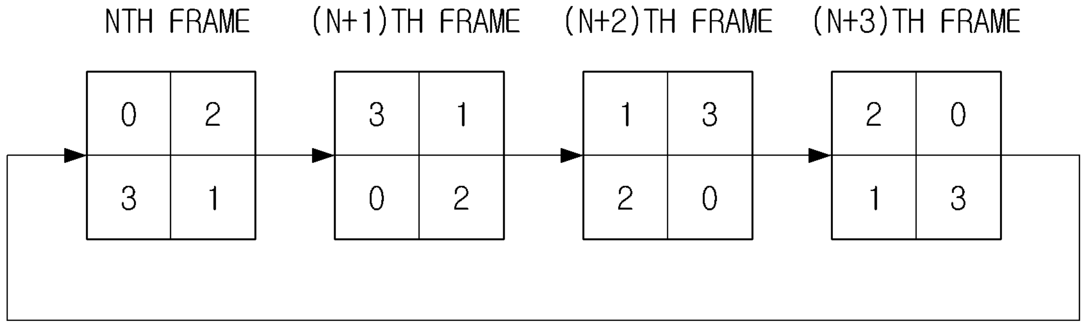
FIG. 7 illustrates the operation of a dither factor computing unit of an image signal processor according to an exemplary embodiment of the present invention.

FIG. 7 explains the operation of the dither factor computing unit 160 of an image signal processor according to an exemplary embodiment of the present invention.

Referring to FIG. 7, the dither factor computing unit 160 outputs 0 from (odd-numbered row and odd-numbered column) of Nth frame, outputs 2 from (odd-numbered row and even-numbered column), outputs 3 from (even-numbered row and odd-numbered column), and outputs 1 from (even-numbered row and even-numbered column). The dither values are output from the other frames (N+1), (N+2) and (N+3) in a like manner.

The pattern generating unit 140 selects one candidate from the subfield candidates listed in Table 1 below based on the dither values, and outputs the result.

TABLE 1

| | Subfield | | | | | | | | |
|---|---|---|---|---|---|---|---|---|---|
| Weight | SF 1<br>1 | SF 2<br>2 | SF 3<br>4 | SF 4<br>8 | SF 5<br>16 | SF 6<br>32 | SF 7<br>64 | SF 8<br>128 | Index |
| Graylevel | ○ | ○ | ○ | ○ | ○ | ○ | ○ | X | 0 |
| 127 | ○ | ○ | ○ | ○ | ○ | ○ | ○ | X | 1 |
| | ○ | ○ | ○ | ○ | ○ | ○ | ○ | X | 2 |
| | ○ | ○ | ○ | ○ | ○ | ○ | ○ | X | 3 |
| Graylevel | ○ | X | ○ | ○ | ○ | X | ○ | X | 0 |
| 128 | ○ | ○ | ○ | ○ | X | ○ | ○ | X | 1 |
| | ○ | ○ | ○ | X | ○ | ○ | ○ | X | 2 |
| | ○ | ○ | X | ○ | ○ | ○ | X | ○ | 3 |

The subfield candidates have one of graylevels 93, 111, 119, and 189 to represent the graylevel 128. In this case, the graylevel is 93 when the index is 0, 111 when the index is 1, 119 when index is 2, and 189 when index is 3. The average of these graylevels 93, 111, 119, and 189 is 128 and it is thus possible to represent the graylevel 128 by spatially combining the four subfield candidates.

In Table 1, the symbol O denotes ON, and the symbol X denotes OFF.

The subfield candidates of graylevel 127 are identical regardless of the dither values, and therefore, the pattern selecting unit 170 outputs an illuminating pattern in which the first to seventh subfields SF1 to SF7 illuminate by 100%.

However, the subfield candidates of graylevel 128 vary from each other depending on the dither values and the pattern selecting unit 170 thus selects one from the subfield candidates based on the dither values and outputs the result. For example, if the dither factor computing unit 160 outputs a 3, the pattern selecting unit 170, with referring to index 3 of Table 1, selects and outputs an illuminating pattern of 'OOXOOOXO'.

Specifically, the graylevel 128 may be obtained by illuminating the first subfield SF1 by 100%, the second to seventh subfields SF2 to SF7 by 75%, and the eighth subfield SF8 by 25%. All four candidate pixels may be made ON to illuminate the first subfield SF1 by 100%, three candidate pixels may be made ON and one may be made OFF to illuminate the second to seventh subfields SF2 to SF7 by 75%, and one may be made ON and three may be made OFF to illuminate the eighth subfield SF8 by 25%.

Referring to FIG. 7, the dither factor computing unit 160 may output dither values 0, 3, 1, and 2 from the (odd-numbered row, odd-numbered column) of the Nth, (N+1)th, (N+2)th, and (N+3)th frames. As a result, it is possible to combine the four subfield candidates in a temporal manner, and express the graylevel 128.

Figure 8:
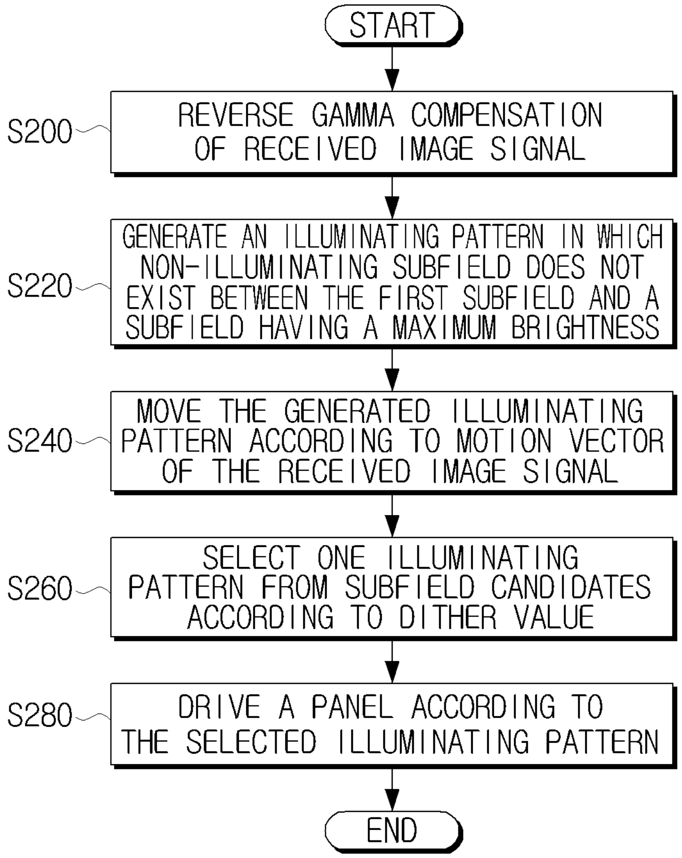
FIG. 8 is a flowchart explaining the operation of an image signal processor according to an exemplary embodiment of the present invention.

FIG. 8 is a flowchart explaining the operation of an image signal processor according to an exemplary embodiment of the present invention.

Referring to FIG. 8, in operation S200, the reverse gamma compensation unit 130 performs reverse gamma compensation of a received image signal. In operation S220, the pattern generating unit 140 generates an illuminating pattern in which a non-illuminating subfield does not exist between the first subfield and a subfield that has a maximum brightness. Referring back to FIG. 4, the pattern generating unit 140 may generate an illuminating pattern, in which a non-illuminating subfield does not exist between the first subfield SF1 and the eighth subfield SF8 that has the maximum brightness, in the pixels f, g, h, i, and j. It is more desirable that the subfields SF2 to SF7 between the first subfield SF1 and the eighth subfield SF8 have a 75% of illuminating rate.

In operation S240, the pattern moving unit 150 moves the illuminating patterns generated by the pattern generating unit 140 based on the motion vectors of the received image signals. In other words, the pattern moving unit 150 moves the illuminating patterns of the subfields to coincide with the movement range of the human eye. Referring back to FIG. 5, the illuminating pattern of the fourth to sixth subfields SF4 to SF6 may be moved to pixel location e, the illuminating pattern of the seventh subfield SF7 may be moved to pixel location d, and the illuminating pattern of the eighth subfield SF8 may be moved to pixel location b, to be coincided with the movement range of the human eye.

In operation S260, the pattern selecting unit 170 selects one illuminating pattern from the subfield candidates according to the dither values output from the dither factor computing unit 160 and outputs the result. In other words, the pattern selecting unit 170 selects one from among the four subfields candidates that correspond to the dither values, according to the dither values.

In operation S280, the panel driving unit 180 drives the panel according to the selected illuminating pattern.

By combining the illuminating patterns that have the illuminating rates of 0%, 25%, 50%, 75% and 100% spatially and temporally, rounding error can be prevented.

As explained above, by setting the subfields to the intermediate illuminating statuses and moving the subfields according to the motion vectors, problems such as pseudo contour, motion blur or rounding error can be prevented, and an image enhancement of a PDP is provided.

While certain exemplary embodiments of the present invention have been shown and described, it will be understood by those skilled in the art that various changes in form and details may be made therein without departing from the spirit and scope of the invention as defined by the appended claims and their equivalents.

What is claimed is:

1. An image signal processor comprising:

a pattern generating unit which generates an illuminating pattern of subfields that constitute one frame of a received image signal to produce a given graylevel, in which a non-illuminating subfield never exists between a first illuminating subfield and a second illuminating subfield; and a pattern moving unit which moves the illuminating pattern and outputs the moved illuminating pattern, wherein all subfields existing between the first illuminating subfield and the second illuminating subfield are selectively illuminated for a plurality of frames such that an average level of illumination for one of the plurality of frames corresponds to the given graylevel; and wherein the first illuminating subfield is a beginning subfield of the one frame, and the second illuminating subfield is a subfield of a frame that has a maximum brightness.

2. The image signal processor of claim 1, wherein the pattern generating unit generates the illuminating pattern in which all the subfields existing between the first and second illuminating subfields have at least a 75% illumination rate.

3. The image signal processor of claim 1, wherein the pattern moving unit moves the illuminating pattern based on a motion vector of the received image signal.

4. The image signal processor of claim 3, wherein the pattern moving unit moves the each illuminating pattern towards a movement range of a human eye, based on the motion vector.

5. The image signal processor of claim 1, further comprising a pattern selecting unit which selects one of a plurality of subfield candidates to represent the illuminating pattern and outputs the selected one of the plurality of subfield candidates.

6. The image signal processor of claim 5, further comprising a dither factor computing unit which provides a dither value, wherein the pattern selecting unit uses the dither value to select the one of the plurality of subfield candidates.

7. The image signal processor of claim 6, wherein the dither factor computing unit provides the dither value so that the plurality of subfield candidates are combined with each other spatially, and the selected one of the plurality of subfield candidates is output based on an illuminating pattern having one of illumination rates 0%, 25%, 50%, 75%, and 100%.

8. The image signal processor of claim 6, wherein the dither factor computing unit provides the dither value so that the plurality of subfield candidates are combined with each other temporally, and the selected one of the plurality of subfield candidates is output based on an illuminating pattern having one of illumination rates 0%, 25%, 50%, 75%, and 100%.

9. The image signal processor of claim 1, further comprising a panel driving unit which drives a display according to the moved illuminating pattern.

10. An image signal processing method comprising:

generating an illuminating pattern of subfields that constitute one frame of a received image signal to produce a given graylevel, in which a non-illuminating subfield never exists between a first illuminating subfield and a second illuminating subfield; and moving the illuminating pattern and outputting the moved illuminating pattern, wherein all subfields existing between the first illuminating subfield and the second illuminating subfield are selectively illuminated for a plurality of frames such that an average level of illumination for one of the plurality of frames corresponds to the given graylevel; and wherein the first illuminating subfield is a beginning subfield of the one frame, and the second illuminating subfield is a subfield of a frame that has a maximum brightness.

11. The image signal processing method of claim 10, wherein the generating comprises generating the illuminating pattern in which all the subfields existing between the first and second illuminating subfields have at least a 75% illumination rate.

12. The image signal processing method of claim 10, wherein the moving comprises moving the illuminating pattern based on a motion vector of the received image signal.

13. The image signal processing method of claim 12, wherein the moving comprises moving the illuminating pattern towards a movement range of a human eye, based on the motion vector.

14. The image signal processing method of claim 10, further comprising selecting one of a plurality of subfield candidates to represent the illuminating pattern and outputting the selected one of the plurality of subfield candidates.

15. The image signal processing method of claim 14, further comprising providing a dither value as a reference for selecting the one of the plurality of subfield candidates.

16. The image signal processing method of claim 15, wherein the providing comprises providing the dither value so that the plurality of subfield candidates are combined with each other spatially, and outputting the selected one of the plurality of subfield candidates based on an illuminating pattern having one of illumination rates 0%, 25%, 50%, 75%, and 100%.

17. The image signal processing method of claim 15, wherein the providing comprises providing the dither value so that the plurality of subfield candidates are combined with each other temporally, and outputting the selected one of the plurality of subfield candidates based on an illuminating pattern having one of illumination rates 0%, 25%, 50%, 75%, and 100%.

18. The image signal processing method of claim 10, further comprising driving a display according to the moved illuminating pattern.

* * * * *